Nov. 18, 1930.   W. W. WELLS   1,782,184
TRANSMISSION
Filed Dec. 22, 1924   2 Sheets-Sheet 1

INVENTOR.
Walter W. Wells
BY Whittemore Hulbert
Whittemore & Belknap
ATTORNEYS

Nov. 18, 1930. W. W. WELLS 1,782,184
TRANSMISSION
Filed Dec. 22, 1924 2 Sheets-Sheet 2

Inventor
Walter W. Wells

By Whittemore Hulbert Whittemore
\& Belknap Attorneys

Patented Nov. 18, 1930

1,782,184

UNITED STATES PATENT OFFICE

WALTER W. WELLS, OF LANSING, MICHIGAN, ASSIGNOR TO REO MOTOR CAR COMPANY, OF LANSING, MICHIGAN, A CORPORATION OF MICHIGAN

TRANSMISSION

Application filed December 22, 1924. Serial No. 757,504.

The invention relates to transmission mechanisms for motor vehicles and has for its principal object the obtaining of a construction providing two speeds, each of which is adapted for driving the vehicle for long periods of time without the gear noise that is present in the conventional types of transmission when operating at any other speed than the direct drive. The invention contemplates the provision of these two speeds in conjunction with the transmission mechanism of the usual type for obtaining still higher ratios that are intended to be used during abnormal conditions such as starting, climbing steep hills and driving over poor roads.

Another object is to provide a transmission assembled as a single unit in a transmission case, but containing therewithin a selective gear set having a plurality of speeds including a reverse and an auxiliary mechanism connected to said gear set and provided with constantly meshing gears, one of which is mounted on an eccentric adapted to be alternatively held from rotation or compelled to rotate in predetermined relation with said gear set.

Other objects reside in the more specific details of construction as hereinafter more fully described.

Figure 1:
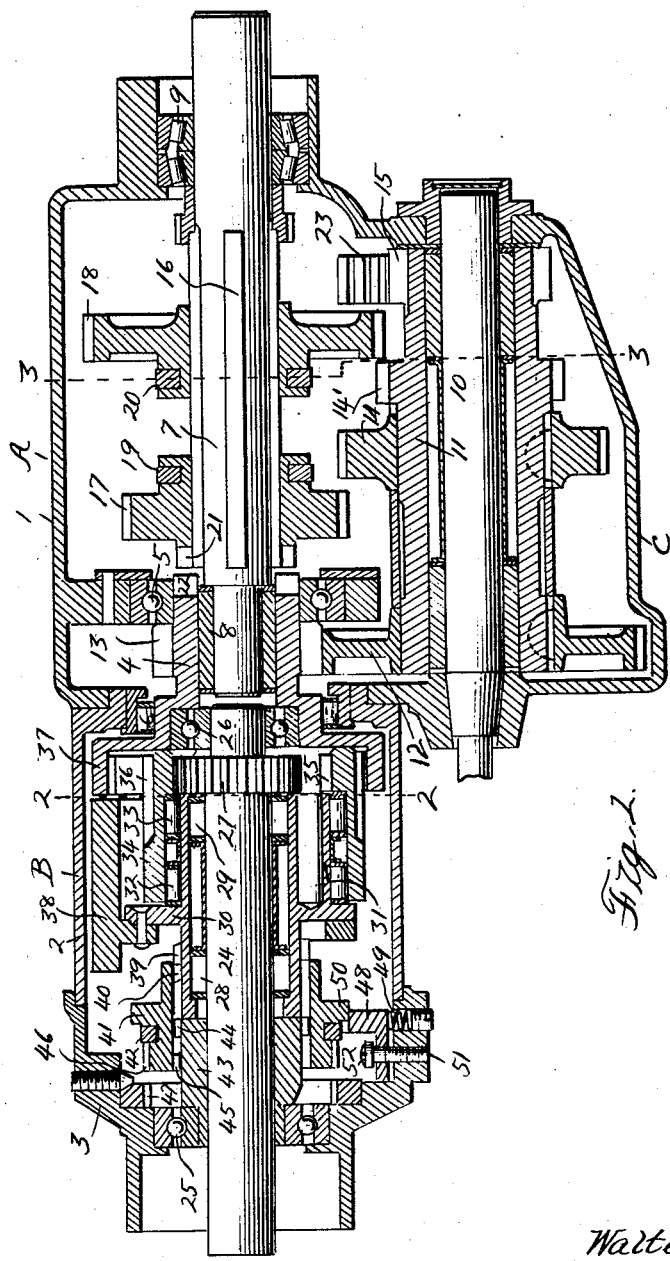
Figure 1 is a longitudinal section through the transmission mechanism.
Figure 2:
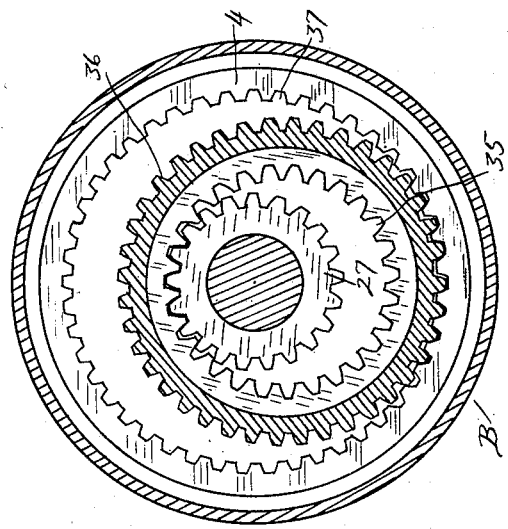
Figure 2 is a transverse section on the line 2—2 of Figure 1.
Figure 3:
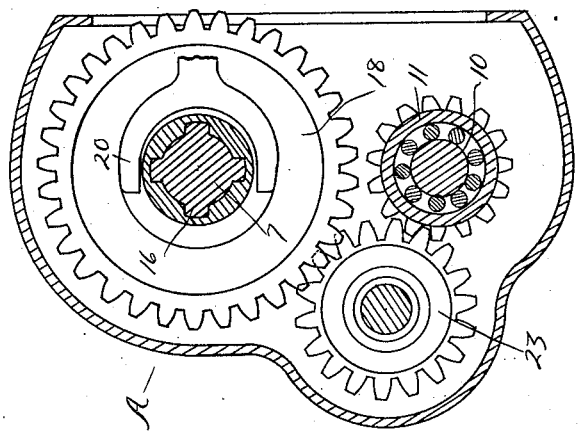
Figure 3 is a transverse section on the line 3—3 of Figure 1.

The improved transmission comprises a sliding gear transmission unit A and an auxiliary variable speed unit B both housed in a suitable transmission casing C, the latter being preferably composed of a plurality of different sections to facilitate the assembly of the parts. As shown, the transmission casing comprises the main housing 1 for enclosing the unit A, the auxiliary housing 2 for enclosing the unit B and an end portion 3. 4 is a rotatable member journaled in the transmission casing intermediate the portions 1 and 2 thereof by means of suitable bearings such as the ball bearings 5 and roller bearings 6. 7 is the main shaft having the forward end thereof journaled in roller bearings 8 within the hollow rotatable member 4, this shaft being also journaled in the roller bearings 9 mounted in the rear of the transmission casing. 10 is the countershaft mounted in the transmission casing parallel to the main shaft and having journaled thereon the rotatable sleeve 11 carrying a plurality of gears. 12 is a constant mesh gear, meshing continuously with the gear teeth 13 on the rotatable member 4 and 14, 14' and 15 are respectively the intermediate gear, low speed gear and reversing gear. The main shaft 7 is provided with splines 16 on which are longitudinally slidable the gears 17 and 18, each being respectively actuated by means of suitable forks 19 and 20. The gear 17 has clutch teeth 21 formed at one end thereof adapted to engage corresponding clutch teeth 22 formed on the rotatable member 4, the arrangement being such that when the gear 17 is moved to its forward position a direct drive is obtained between the rotatable member 4 and the main shaft 7.

Intermediate speed is obtained by shifting the gear 17 to its rear position where it engages the gear 14 on the countershaft thereby coupling the rotatable member 4 with the main shaft 7 through a set of gearing having a greater ratio. Low speed is obtained by shifting the gear 18 into engagement with gear 14' while the reverse speed is obtained by shifting gear 18 to its rear position where it meshes with a reverse idler gear 23, the latter being arranged to constantly mesh with the gear 15 on the countershaft. The arrangement of the sliding gears as above described is of the conventional design widely used in automobile transmissions at the present time.

24 is a shaft journaled in the forward part of the transmission casing C in axial alignment with the main shaft 7 and is preferably mounted on suitable anti-friction bearings 25 in the forward end of the case and the bearings 26 within the rotatable member 4. This shaft has an external gear 27 secured thereto and also has rotatably mounted thereon by means of the roller bearings 28 and 29 an eccentric 30 having an eccentric hub 31 for receiving roller bearings 32 and 33 for receiving sleeve 34. This sleeve can therefore, rotate eccentrically with respect to the shaft 24 and is provided with internal gear teeth 35 meshing with the gear 27 and the external gear teeth 36 meshing with internal gear teeth 37 formed on the forward end of the rotatable member 4. 38 is a counterweight secured to the eccentric 30 to compensate for the offset hub 31 in order that the eccentric may be properly balanced when rotating about the shaft 24.

The eccentric is also provided with the external splines 39 adapted to be engaged by the teeth 40 of a clutch coupling sleeve 41, the latter being longitudinally slidable by means of a suitable shifting fork 42. 43 is a collar secured to the shaft 24 and provided with clutch teeth 44 adapted to engage clutch teeth 45 on the sleeve 41 when the latter is in its rear position of adjustment. The sleeve is also provided with the external clutch teeth 46 adapted to engage the stationary clutch jaws 47 when the sleeve 41 is in forward position. For stopping the rotation of the eccentric 30 before clutching the same to the clutch jaws 47 there is provided a suitable braking mechanism comprising the brake shoe 48 resiliently pressed inward by the spring 49 and adapted to engage the flange 50 of the clutch sleeve 41. As shown, the brake shoe is slidably supported on the shank of a machine screw 51, the head 52 of which serves as a stop for limiting the inward movement of the brake shoe. The adjacent edges of the brake shoe 48 and flange 50 are also preferably bevelled to facilitate the engagement of the same when the clutch sleeve 41 is shifted forwardly into engagement with the clutch jaws 47.

The direct drive of the transmission is obtained when the clutch sleeve 41 is in its rearward position thereby locking the eccentric 30 to the shaft 24. This arrangement compels the shaft 24, eccentric 30, eccentric gear 34 and the rotatable member 4 to rotate together as a single unit, there being no relative rotation of the various parts. When the clutch sleeve 41 is in the forward position, the eccentric 30 is locked against rotation by reason of the engagement of clutch teeth 46 and 47 and engagement of splines 39 with clutch teeth 40. With this arrangement the gear 27 rotates the eccentric gear 34 which, in turn, rotates the internal teeth 37 thereby coupling the shaft 24 and rotatable member 4 and providing a gear reduction.

With the transmission as above described, it will be apparent that I have provided an arrangement permitting six different forward speed ratios and two different reverse speed ratios since units A and B may each be shifted independently. For each of the possible speed ratios obtained from the sliding gear unit A there are two alternative combinations of the unit B so that when the latter unit is arranged for direct drive there are obtained the ordinary gear reductions provided by the unit A, while with the unit B in its other alternative position each of the ratios provided by the sliding gear unit A is modified by the reduction introduced by the unit B.

What I claim as my invention is:—

1. A transmission comprising a pair of casings, a splined main shaft in one casing, a bearing projecting inwardly from said casing, a second shaft in axial alignment with said splined shaft, a rotatable member journaled on said splined shaft having integral internal teeth surrounding a portion of said second shaft, said member having one end carried by the inwardly projecting bearing aforesaid, said member having integral external teeth lying between said bearing and the other of said casings, an eccentrically journaled gear meshing with said internal teeth, a pinion on said second shaft meshing with said eccentric gear, a rotatable carrier for said eccentric gear, means for clutching said carrier alternatively to said casing or to said second shaft, a countershaft continuously geared to said integral external teeth of said rotatable member, a series of gears driven by said countershaft and a plurality of sliding gears on said splined shaft alternatively engageable with said rotatable member or to said countershaft gears.

2. A transmission comprising a pair of interconnected casings, a rotatable member journaled in one of said casings and projecting within the other of said casings, a projection in one of said casings having a bearing for one end of said member, external teeth on said member between said bearing and journal respectively, axially aligned shafts in each of said casings, each having one end journaled in a casing and the other end journaled in said rotatable member, a countershaft gearing between said countershaft and said external teeth, gearing between said countershaft and one of said axially aligned shafts and internal gearing between said rotatable member and the other of said shafts.

In testimony whereof I affix my signature.

WALTER W. WELLS.